US00RE34240E

United States Patent [19]

Lin

[11] E Patent Number: Re. 34,240

[45] Reissued Date of Patent: May 4, 1993

[54] TUBULAR DOOR LOCK WITH AN ADJUSTABLE DEVICE FOR SETTING THE DEAD BOLT

[75] Inventor: Jui C. Lin, Kaohsiung, Taiwan

[73] Assignee: Taiwan Fu Hsing Industry Co., Ltd., Kaohsiung, Taiwan

[21] Appl. No.: 686,513

[22] Filed: Apr. 17, 1991

Related U.S. Patent Documents

Reissue of:

[64] Patent No.: 4,890,871
Issued: Jan. 2, 1990
Appl. No.: 272,383
Filed: Nov. 17, 1988

[51] Int. Cl.[5] ..... E05C 1/16

[52] U.S. Cl. ..... 292/337; 292/1.5

[58] Field of Search ..... 292/1, 337, 169, 169.21, 292/169.23, 169.14, DIG. 60, DIG. 74, 172

[56] References Cited

U.S. PATENT DOCUMENTS

| | | | |
|---|---|---|---|
| 4,333,324 | 6/1982 | Dietrich et al. | 70/107 |
| 4,427,224 | 1/1984 | Bergen | 292/169.23 |
| 4,615,549 | 10/1986 | Couture | 292/169.21 |
| 4,623,174 | 11/1986 | Trull et al. | 292/1 |
| 4,639,025 | 1/1987 | Fann et al. | 292/337 |
| 4,662,665 | 5/1987 | Lin | 292/167 |
| 4,687,239 | 8/1987 | Lin | 292/172 |
| 4,711,477 | 12/1987 | Fann et al. | 292/169.14 |
| 4,746,154 | 5/1988 | Fang | 292/337 |
| 4,750,766 | 6/1988 | Shen | 292/337 |
| 4,767,140 | 8/1988 | Lin | 292/337 |
| 4,768,817 | 9/1988 | Fann et al. | 292/337 |
| 4,804,216 | 2/1989 | Marotto | 292/1 |
| 4,850,626 | 7/1989 | Gallego | 292/1 |
| 4,927,195 | 5/1990 | Wu et al. | 292/DIG. 74 |
| 4,927,199 | 5/1990 | Wu et al. | 292/DIG. 74 |

OTHER PUBLICATIONS

"Kwikset's New Exclusive Adjustable Deadlatch", Emhart ADLCS-6-83-50JL.

*Primary Examiner*—Eric K. Nicholson
*Attorney, Agent, or Firm*—Jacobson, Price, Holman & Stern

[57] ABSTRACT

A tubular door lock making use of two pairs of motive teeth in a pulling plate for a two-tooth gear to selectively mesh with for an motive action. The gear is confined within a hole cut in a moving shell, which can move outside along the assembling plates and be fixed to keep a hole in it to exactly face against a hole in the assembling plates so as to enable the foot post of the door lock to penetrate through the both holes, whether this lock is adjusted in the short or in the long size.

6 Claims, 3 Drawing Sheets

TUBULAR DOOR LOCK WITH AN ADJUSTABLE DEVICE FOR SETTING THE DEAD BOLT

Matter enclosed in heavy brackets [ ] appears in the original patent but forms no part of this reissue specification; matter printed in italics indicates the additions made by reissue.

BACKGROUND OF THE INVENTION

According to the U.S. Pat. No. 4,687,239, the action of the door lock is first to turn around the rotating shell 3 so as to enable the hook 32 on the rotating shell to hook on or release from the notch 41 of the extending shell 4, so that the shell 4 can be moved or fixed still. The parts used in the patent are so numerous that many molds are needed for its manufacture. In addition, the adjustment of the dead bolt is not so simple. Later on, the same inventor filed an application of the U.S. Ser. No. 920,673, a modified adjusting structure on the U.S. Pat. No. 4,687,239.

SUMMARY OF THE INVENTION

The object of this invention is to provide a more convenient and simpler tubular lock with an adjustable device for setting the dead bolt.

BRIEF DESCRIPTION OF THE DRAWINGS

This invention will now be described in detail with reference to accompanying drawings wherein.

DETAILED DESCRIPTION OF THE INVENTION

Figure 1:
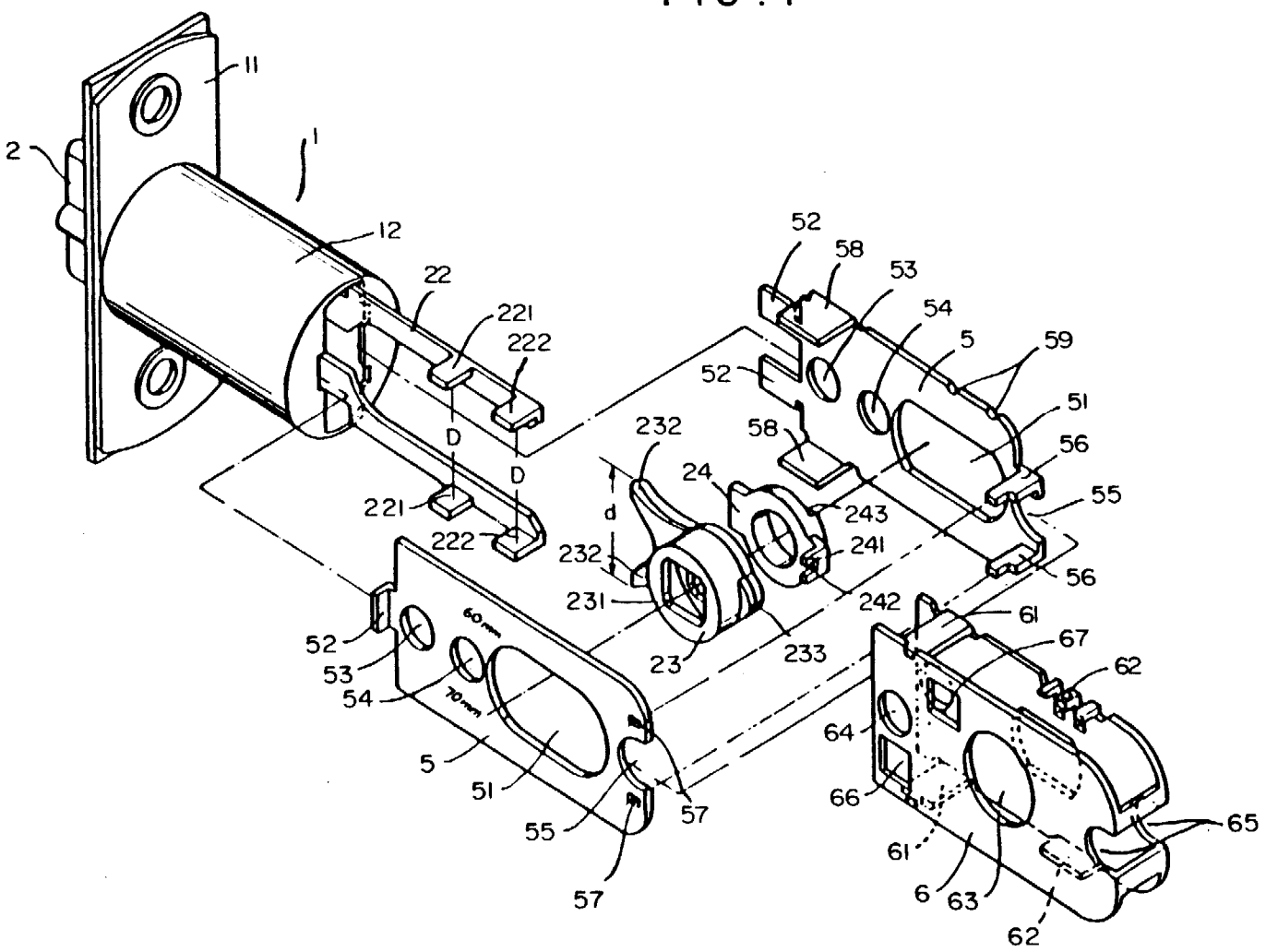
FIG. 1 is an exploded perspective view of the tubular door lock with an adjustable device for setting the dead bolt in accordance with the present invention.

First of all, as shown in FIG. 1, this invention is composed of a lock case 1, a dead bolt 2, assembling plates 5 and a moving shell 6 as its main parts.

The lock case 1 comprises a face-plate 11 and a cylinder 12 which is able to contain the dead bolt 2 therein and has a slot at its bottom for a pulling plate 22 to extend through. The pulling plate 22 possesses two pair of up-right square protrusions 221, 222 meshing with a two-tooth gear 23 so as to give mutual movement.

The two-tooth gear 23 has a square hole 231 at its center for the insertion of the square shaft of the door lock and two teeth 232 whose distance "*d*" between their tip ends is shorter than [that] *the distance "D"* between *inner surfaces of* each pair of the up-right protrusions 221, 222 so that the teeth 232 can mesh with the protrusions 221, 222 to move the pulling plate 22 while the two-tooth gear 23 is turning around. In order to keep the two-tooth gear 23 confined between the protrusions 221, 222 while it is not turning around, the two-tooth gear 23 is provided with a round protrusion 233 that is to fix with a notch 242 of an arm 241 on a fixing wheel 24. The fixing wheel 24 possesses two horizontal parallel flat faces 243 on its upper and lower sides which can match with the two horizontal parallel edges of an elliptical hole 51 of the assembling plate 45 so that the two-tooth gear 23 can not turn around by itself. When gear 23 is connected to a doorknob, however, and the knob is positively rotated there is sufficient flexibility in the arms 241 to allow protrusion 233 to leave the notch, so that gear 23 can rotate.

The assembling plates 5 include two pieces. Provided at their fronts are plate hooks 52 hooking at the bottom of the cylinder 12. Each assembling plate 5 has an elliptical hole 51: One elliptical hole 51 is used for restricting the fixing wheel 24 to move in a linear direction and the other for the round protrusion 233 of the two-tooth gear 23 to extend out. In addition, the assembling plates 5 have three holes 53, 54, 55 respectively. The distance between the holes 53 and 54 is the same as that between the up-right protrusions 221 and 222. When the two-tooth gear 23 is positioned at the front of the elliptical hole 51, the distance between the center of the hole 53 and the center of the gear 23 is the same as that between the center of the hole 55 and the center of the gear 23, and when the gear 23 is positioned at the rear of the elliptical hole 51, the distance between the center of the hole 54 and the center of the gear 23 is equal to the distance between the center of hole 55 and the center of gear 23. The two assembling plates 5 are linked together with pins 56 inserting in holes 57 and keep contact with each other by means of two protrusions 58 pushing each other in holding their positions. Moreover, one assembling plate 5 is set with two fixing notches 59 to lock with a protrusion 62 of the moving shell 6 so as to fix up the moving shell 6 on the assembling plates.

The moving shell 6 is combined lengthwise at the outside of the assembling plates 5 and able to move along the assembling plates 5 by means of linking plate 61 and a protrusion 62. And as mentioned previously, the protrusion 62 can be locked in one of the notches 59 of the assembling plate 5. The moving shell 6 is provided with a hole 63 for the round circumference of the two-tooth gear 23 to go in and to revolve therein. At the left and the right of the hole 63 are respectively provided a hole 64 and 65 with the same distance whether between the hole 63 and the hole 64 or between the hole 63 and the hole 65. And this distance is the same as that between the two-tooth gear 23 and the hole 53 or 54 or 55 whether the gear 23 is positioned at the front or the rear of the elliptical hole 51 as mentioned previously. In addition, two square holes 66 and 67 are to match with the scale reading on the assembling plates 5 to represent the length of the whole dead bolt while the moving shell 6 moves along the assembling plates 5.

Figure 2:
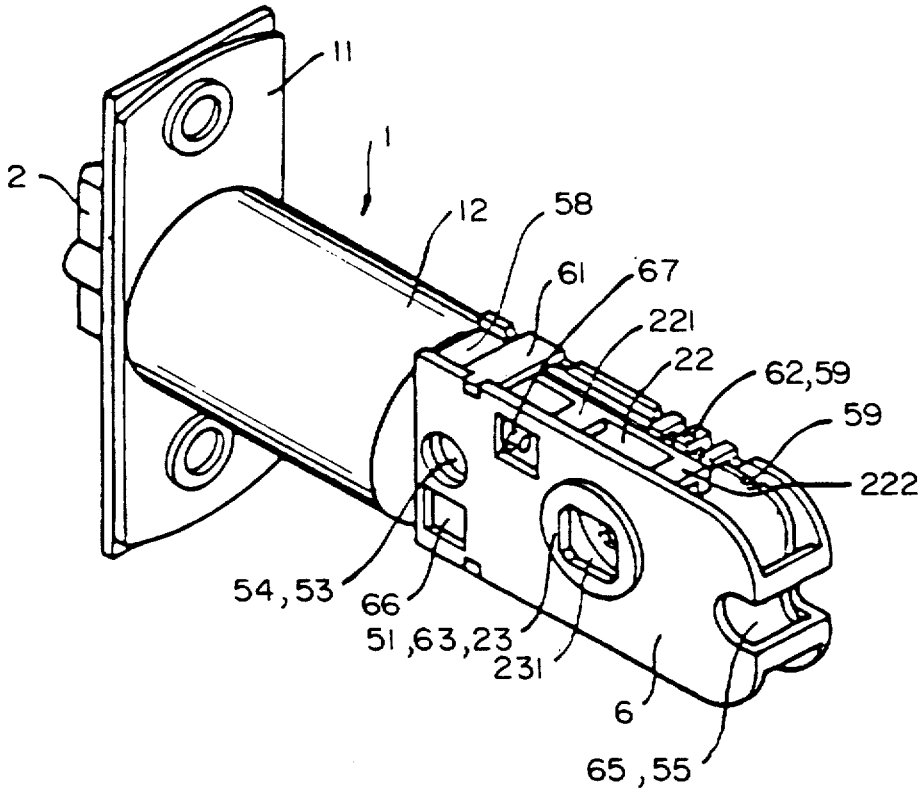
FIG. 2 is a perspective view of the tubular door lock adusted in the short size in accordance with the present invention.
Figure 3:
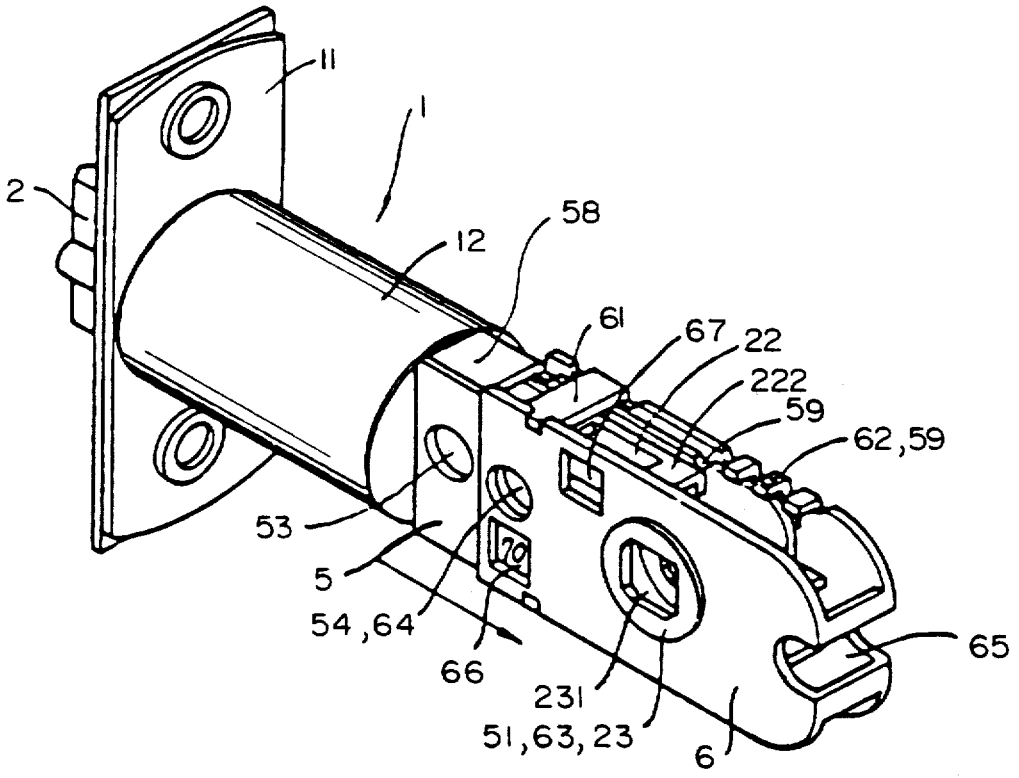
FIG. 3 is a perspective view of the tubular door lock adjusted in the long size in accordance with the present invention.

Next, as shown in FIG. 2, it represents the embodiment of this lock adjusted in the short size. When the moving shell 6 is moving towards the cylinder 12, the two-tooth gear 23 is going to be locked at the front of the elliptical hole 51. The hole 64 is then facing exactly against the hole 53 and the hole 55 against the hole 65 and they are all ready for the foot posts of the door lock to penetrate. Meanwhile, the two-tooth gear shaft hole 231 can be penetrated by the square shaft of the door lock. And when the two-tooth gear 23 is turned around, one tooth 232 is to pull against a corresponding one of the protrusions 221 of the pulling plate 22 to function as a motive action. Finally, as shown in the FIG. 3, when the moving shell 6 is moving away from the bottom of the cylinder 12 and compels the two-tooth gear 23 to be positioned at the rear of the elliptical hole 51, the hole 64 and the hole 54 face each other for one of the foot posts of the door lock to penetrate and the other foot post can directly penetrates through the hole 65. Meanwhile, the square shaft still passes through the shaft hole of the two-tooth gear 23. As the two-tooth gear 23 is turned around, one of the teeth 232 pulls against one of the protrusions 222 of the pulling plate 22 to function as a motive action. This represents the embodiment of this lock adjusted in the long size.

In short, it is merely necessary to move the moving shell 6 forwards or backwards for practically adjusting the size of this lock. Therefore, it is really very convenient for adjusting and simple for manufacturing this lock.

I claim:

1. A tubular door lock with a cylinder having a face plate at one end thereof, a dead bolt mounted in the cylinder, and an adjustable device for setting the dead bolt comprising a pulling plate having two pairs of protrusions for meshing selectably with a two-tooth gear that is confined in a hole of a movable shell, the gear having a shaft aperture and able to move horizontally along an elliptical hole in one of two assembling plates, said one assembling plate having a fixing notch, said movable shell having a protrusion for locking in the fixing notch of said assembling plate so that said gear can be moved horizontally by the moving of said movable shell to change the distance between the face plate and the shaft aperture of said gear and still mesh with said protrusions of said pulling plate for moving the dead bolt, and two holes being provided in said movable shell for corresponding with the holes of said assembling plates when said movable shell is moved to either of its positions so as to enable a foot post of the door lock to penetrate through.

2. The tubular door lock as claimed in claim 1, wherein said two-tooth gear is combined with a fixing wheel which possesses two horizontal upper and lower faces able to lock with two upper and lower straight edges of said elliptical hole of the assembling plate so as to keep said fixing wheel movable in a linear direction and a protruding arm having a notch to engage with a round protrusion of said gear so as to keep said gear from turing around at random.

*3. A tubular door lock with a cylinder having a face plate at one end thereof, a dead bolt mounted in the cylinder, and an adjustable device for setting the dead bolt comprising a pulling plate having two pairs of protrusions for meshing selectably with a two-tooth gear that is confined in a hole of a movable shell, the gear having a shaft aperture and able to move horizontally along an elliptical hole in one of two assembling plates, said one assembling plate having a notch, said movable shell having a protrusion for engaging the notch of said assembling plate so that said gear can be moved horizontally by the moving of said movable shell to change the distance between the face plate and the shaft aperture of said gear and still mesh with said protrusions of said pulling plate for moving the dead bolt, and two holes being provided in said movable shell for corresponding with the holes of said assembling plates when said movably shell is moved to either of its positions so as to enable a foot post of the door lock to penetrate through.*

*4. The tubular door lock as claimed in claim 3, wherein said two-tooth gear is combined with a fixing wheel which possesses two horizontal upper and lower faces able to lock with two upper and lower straight edges of said elliptical hole of the assembling plate so as to keep said fixing wheel movable in a linear direction and a protruding arm having a notch to engage with a round protrusion of said gear so as to keep said gear from turning around at random.*

*5. A tubular door lock with a cylinder having a face plate at one end thereof, a dead bolt mounted in the cylinder, an adjustable device for setting the dead bolt comprising a pulling plate having a forward pair of protrusions and a rearward pair of protrusions for meshing selectably with a gear with two teeth that is confined in a hole of a movable shell, the gear having a shaft aperture and able to move horizontally along an elliptical hole in one of two assembling plates, said teeth having tip ends spaced apart at a distance which is shorter than the distance between inner surfaces of respective protrusions of each pair of said protrusions so that said gear can be moved horizontally by the moving of said movable shell to change the distance between the face plate and the shaft aperture of said gear and enabling said teeth to still mesh with said protrusions of said pulling plate for moving the dead bolt when the gear is rotated, and two holes being provided in said movable shell for corresponding with the holes of said assembling plates when said movably shell is moved to either of its positions so as to enable a foot post of the door lock to penetrate through.*

*6. The tubular door lock as claimed in claim 3, wherein said two-tooth gear is combined with a fixing wheel which possesses two horizontal upper and lower faces able to lock with two upper and lower straight edges of said elliptical hole of the assembling plate so as to keep said fixing wheel movable in a linear direction and a protruding arm having a notch to engage with a round protrusion of said gear so as to keep said gear from turning around at random.*

* * * * *